United States Patent [19]

Stahle et al.

[11] 4,190,831
[45] Feb. 26, 1980

[54] LIGHT PEN DETECTION SYSTEM FOR CRT IMAGE DISPLAY

[75] Inventors: Howard L. Stahle, Burbank; Norman R. Grossman, Canoga Park, both of Calif.

[73] Assignee: The Singer Company, New York, N.Y.

[21] Appl. No.: 904,119

[22] Filed: May 8, 1978

[51] Int. Cl.² ............................................... G06F 3/14
[52] U.S. Cl. .................................... 340/707; 340/747; 340/799
[58] Field of Search ............... 340/707, 709, 747, 798, 340/799, 800

[56] References Cited

U.S. PATENT DOCUMENTS

| | | | |
|---|---|---|---|
| 3,037,192 | 5/1962 | Everett | 340/707 |
| 3,131,154 | 4/1965 | Henne | 340/707 |
| 3,402,395 | 9/1968 | Culler et al. | 340/798 |
| 3,413,515 | 11/1968 | Haring | 340/707 |
| 3,543,240 | 11/1970 | Miller et al. | 340/707 |
| 3,680,078 | 7/1972 | Baskin | 340/707 |
| 3,774,158 | 11/1973 | Clark | 340/707 |
| 3,944,988 | 3/1976 | Mayer | 340/707 |
| 3,997,891 | 12/1976 | Iwamura | 340/707 |
| 4,129,858 | 12/1978 | Hara | 340/707 |

*Primary Examiner*—Marshall M. Curtis
*Attorney, Agent, or Firm*—Robert E. Smith; Charles R. Lewis; Edward L. Bell

[57] ABSTRACT

In addition to the binary code that controls the image, or portion thereof, that is to be graphically traced on the screen of a cathode ray tube, a refresh memory also provides an identification code indicative of the image, or portion thereof, within the refresh memory. While the image, or portion thereof is being traced on the screen of the cathode ray tube, the identification code from the refresh memory is stored in a register. A light pen output signal generated by sensing light from the trace on the screen of the cathode ray tube enables the identification code stored in the register to be transferred to a computer to provide the computer with an accurate input as to which image, or portion thereof, the operator identified with the light pen. Means are also provided to disable the light pen whenever the portion of the display being traced on the screen of the cathode ray tube is not intended to be accessible to the operator by means of the light pen.

10 Claims, 1 Drawing Figure

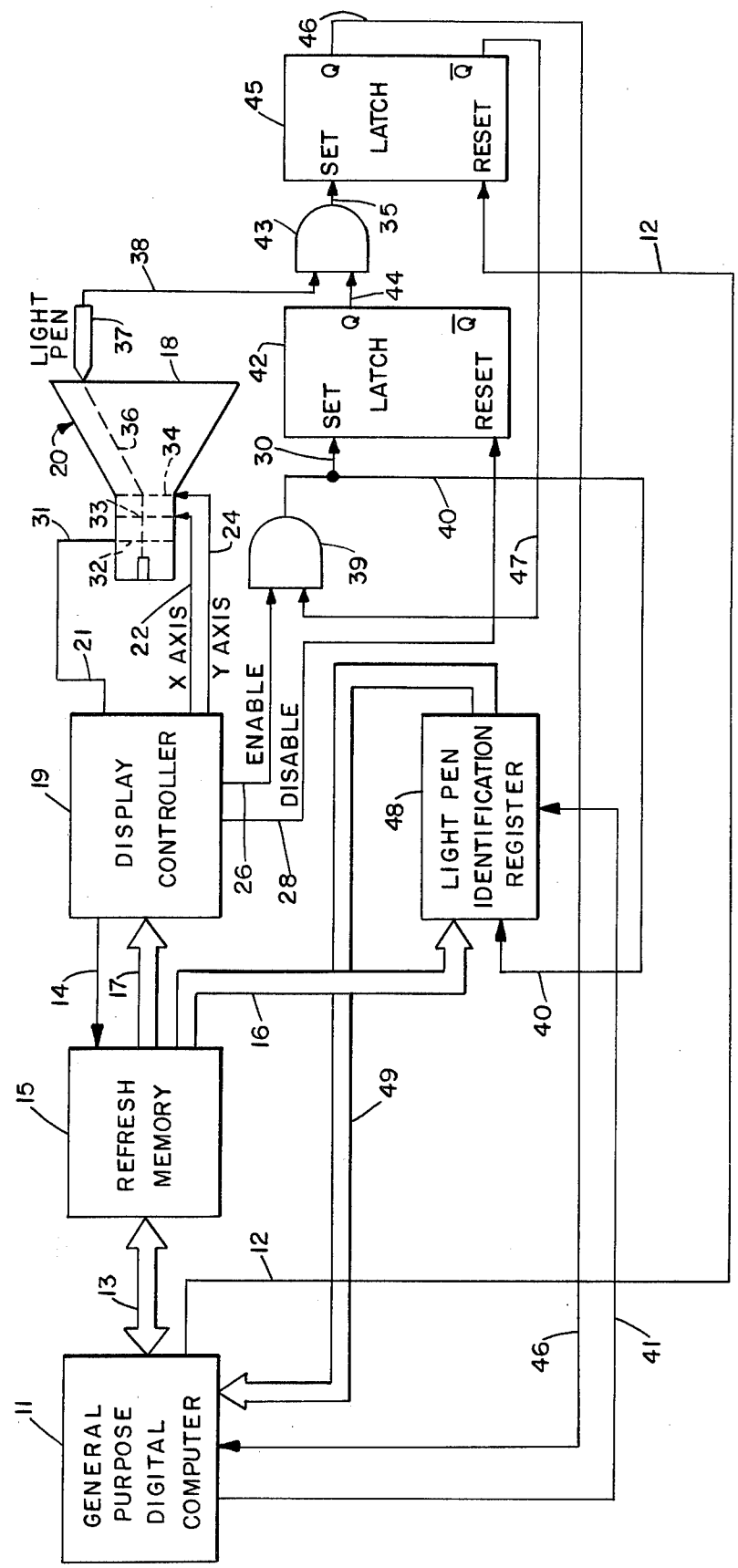

LIGHT PEN DETECTION SYSTEM FOR CRT IMAGE DISPLAY

FIELD OF THE INVENTION

This invention relates to graphic displays generated on the screen of a cathode ray tube that are interactive with a light pen and more particularly to such graphic displays wherein the identification code of an image, or portion thereof, to be traced is supplied together with the code word indicative of the image, or portion thereof, to enable accurate identification of the traced image, or portion thereof, selected by operator manipulation of the light pen.

BACKGROUND OF THE INVENTION

Digitally controlled, refreshed displays are generally implemented by two different methods. Displays can be generated on the screen of a cathode ray tube by using a scan method similar to TV where the picture is generated by moving the intensity producing electron beam horizontally across the cathode ray tube screen at slightly different vertical positions. Several hundred horizontal scans are made per second to prevent the appearance of flicker. Graphic displays on the other hand make use of the ability to digitally specify a position on the cathode ray tube screen and then move the intensity producing electron beam in the manner required to generate the desired symbol or image. A given display may consist of many symbols and/or figures, all of which have to be generated or refreshed several times a second (typically 50 times per second) in order for the image to appear to be constantly illuminated with no flicker.

In order to refresh the display, a memory device is usually provided that contains the digital information necessary to continually regenerate the display. The memory is organized into words each containing a specified number of binary bits that are indicative of an image or portion thereof. A display controller accesses the code words in the memory and interprets the bit configurations to perform a specified display function, much as a digital computer accesses a memory to retrieve instructions that are to be executed. Typical display controller functions include position operations indicating an X and Y location on the cathode ray tube screen; image operations indicating a particular image to be generated at a previously specified X and Y location on the cathode ray tube screen; and line generation operations indicating the direction and length of a line to be generated starting at a previously specified location. Display generation, accordingly, consists of accessing memory words, interpreting the words, executing the specified operations, detecting the of a generation of an image, and refreshing the display at a constant rate to provide a constant intensity to the observer.

In order to make a display "operator interactive" means are provided to allow the operator to indicate a specific cathode ray tube screen location to computing means. Track balls, encoders, and joysticks provide this function by allowing the operator to specify the location on the cathode ray tube screen by the position of a cursor controlled by the operator. After the operator has positioned the cursor at the desired location, a separate switch is activated to indicate that the desired screen location is the position of the cursor. A ligh pen performs the same function directly without the use of a cursor and contains a sensor that is sensitive to the wave length of light emanated from the cathode ray tube screen. Since the cathode ray tube screen emits light from a location only for a short period immediately after the location is traced by the electron beam under the control of the display controller, the output from a light pen held at an illuminated point on the cathode ray tube screen will be present only when the point is being traced by the electron beam. Since the display controller maintains the X and Y position of the electron beam on the cathode ray tube screen during the time the beam is activated to produce the illumination, the light pen output can cause the X and Y position of the electron beam on the cathode ray tube screen indicated by the display controller to be made available to the computing means controlling the display system.

The output from the light pen, however, is delayed by the response time of the light radiating element, such as phosphor, of the cathode ray tube screen and the response time of the light pen sensor. As is set forth in U.S. Pat. No. 3,543,240, the contents of which are incorporated herein by reference, there are various other circumstances when the then X and Y positions of the tracing electron beam provided by the display controller do not correspond to the position of the traced display intended to be identified by the light pen output. Accordingly, the X and Y positions of the traced display provided to the computing means by the display controller do not always define the exact location at which the light pen is pointed.

The system described in U.S. Pat. No. 3,543,240 identifies the location at which the light pen is pointed by stepping a counter each time a portion of the traced image is generated by means of the associated code word. The count in the counter corresponds to the address in the refresh memory of the segment of the image then being traced. The address identifying count remains in the counter once the corresponding display segment is identified by a light pen actuation until the computing means is ready to receive the count thereby identifying the light pen selected display segment to the computing means. Although the light pen detection system described in this patent overcomes many deficiencies of the prior art, it does have the disadvantage that each segment of each displayed image must have an address code associated therewith rather than having the flexibility of an identification code identifying an entire symbol that is displayed or separate identification codes for identifying one or more segments of the displayed symbol. Also, since the counter must be successively stepped, the same address cannot be utilized for various segments of the displayed symbols when the computing means response is identical for the segments identified. Further, the light pen detection system described in this patent does not permit the light pen to be disabled whenever the portion of the display that is not to be interactive with the light pen is being traced to reduce input errors to the computing means. Such a capability also allows one image in close proximity, or overlapping, with another image to be light pen distinguishable as long as only the pertinent image is enabled for interaction with the light pen.

Accordingly, one object of this invention is to provide an improved light pen interactive graphic display system.

Another object of this invention is to provide a graphic display system wherein the position of the light pen identified displayed image, or portion thereof, is accurately determined.

A further object of the present invention is to provide a light pen interactive graphic display system wherein the light pen is disabled when the portion of the display not meant to be interactive with the light pen is being traced.

Still another object of this invention is to provide a light pen interactive graphic display system wherein an entire displayed image or any number of segments thereof are identified by a single identification code.

An additional object of this invention is to provide a light pen interactive graphic display system wherein a single identification code identifies one or more displayed images or, alternatively, unique identification codes are provided for at least some of the segments of the displayed images.

SUMMARY OF THE INVENTION

Briefly described, these and other objects, features and advantages of the present invention are achieved in a graphic display system that includes a cathode ray tube having an intensity control input for an electron beam therein and having a sweep control input for deflecting the electron beam across a screen of the cathode ray tube to produce at least one luminous trace thereon. A light pen is positionable adjacent to a trace on the cathode ray tube screen for picking up at least one light pulse from a display trace and producing an electrical output signal indicative thereof. Computing means include a memory for storing a plurality of code words that identify the different components of an image to be traced on the cathode ray tube screen and for storing the identification code in the memory of at least some of the code words. Display control means coupled between the computing means and the inputs to the cathode ray tube are adapted to sequentially receive the code words from the memory and in response thereto to provide signals to the intensity input and the sweep control input of the cathode ray tube to cause the image identified by the code words to be traced on the screen of the cathode ray tube. A storage register is also coupled to the memory and is adapted to receive the identification code of at least some of the code words indicative of an image to be traced as they are sequentially transferred to the display control means. Transfer means are coupled to the computing means and are responsive to the light pen output signal for enabling the identification code in the storage register to be transferred to the computing means to accurately identify an image, or portion thereof, on the cathode ray screen selected by the light pen. The display control means are also coupled to the light pen whereby the light pen is enabled and disabled under the control of the display control means such that a light pen output is enabled only when that portion of the display is being generated that is intended to be interactive with the light pen.

BRIEF DESCRIPTION OF THE DRAWING

The light pen identification system of the present invention is clearly illustrated in the single simplified logic and block diagram.

DESCRIPTION OF THE PREFERRED EMBODIMENT

Referring now to the single drawing, it is seen that the light pen detection system of the present invention includes computing means which may comprise a general purpose digital computer 11. The symbols, figures, images and the like which are to be graphically displayed are identified by a plurality of code words which are stored in a refresh memory 15. The refresh memory 15 may constitute a part of the computer 11 or may constitute a separate memory that communicates bilaterally with the digital computer 11 by way of parallel leads 13. In addition to storing the code words that identify the display images, the memory 15 also stores an identification code that identifies the image or portion thereof, that is to be displayed and be interactive with a light pen. The code word that identifies an image, or portion thereof, that is to be displayed appears on leads 17 whereas the identification code word appears simultaneously on parallel leads 16. If the code word appearing on the leads 17 relates to a portion of the display that is not to be interactive with a light pen, no corresponding identification code needs to appear on the leads 16.

A display controller 19 receives the image identifying code words appearing on leads 17. Once the identified image or portion thereof has been generated, the display controller 19 will receive the next code word from the refresh memory 15 by accessing the refresh memory 15 by way of lead 14. The display, which may comprise a plurality of images, symbols, figures and/or alphanumeric characters and the like, is generated on a screen 18 of a cathode ray tube 20. The cathode ray tube 20 includes intensity control means 32 for controlling an electron beam 36 the X position of which is controlled by deflection means 33 and the Y position of which is controlled by deflection means 34. A light pen 37 is operator positionable adjacent to the cathode ray tube 20 screen 18 and provides an electrical output signal on an output lead 38 when enabled by a luminous trace on the screen 18 in a well known manner.

Each image identifying code word appearing in the display controller 19 is interpreted in accordance with well known means to provide an intensity control signal on the lead 31 that controls the intensity of the electron beam 36 of the cathode ray tube 20. The display controller 19 also interprets the code words to provide a signal on lead 22 that controls the position of the electron beam 36 in the X axis and to provide a signal on the lead 24 to control the position of the electron beam 36 along the Y axis to generate the image, or segment thereof, that is identified by the code word then appearing in the display controller 19. If the code word appearing in the display controller 19 corresponds to that portion of the display that is meant to be interactive with the light pen 37 the display controller provides an enabling signal on lead 26. On the other hand if the code word within the display controller 19 corresponds to a portion of the display that is not meant to be interactive with the light pen 37 a disable signal is caused to appear on lead 28. As will be apparent to those skilled in the art, whether a code word corresponds to a portion of the display that is to be interactive or not to be interactive with the light pen 37 can be determined by the binary code of the code word itself or by utilizing a bit position within the code word to indicate whether the code word identifies a portion of the display that is or is not to be interactive with the light pen 37.

A register 48 is utilized to sequentially store the identification codes which appear on the leads 16. However, an identification code within the memory 15 appearing on the leads 16 will not be placed into the register 48 unless the enabling lead 40 coupled to the register 48 is enabled. At the option of the user, a single identification code within the register 48 may identify the entire image that is generated on the screen 18 of the cathode ray tube 20 by a plurality of code words that are successively applied to the display controller 19. Alternatively, a unique identification code can be associated with one or more of the plurality of code words needed to generate an entire image. When the input to the register 48 from the computer 11 by way of a lead 41 is active, the identification code within the register 48 is transferred to the computer 11 by way of parallel leads 49.

Interconnecting the display controller 19, the light pen 37 and the register 48 are a first AND gate 39, a first latch 42, a second AND gate 43, and a second latch 45. The first AND gate 39 has two inputs and a single output. The first latch 42 may include any suitable bistable device having two stable states such as a set/reset flip-flop and includes a set input, a reset input, and an output corresponding to the set condition of the latch. The second AND gate 43 has two inputs and a single output. The second latch 45 may constitute any suitable bistable device having two stable states such as a set/reset flip-flop and includes a set input, a reset input, an output corresponding to the set condition of the latch, and an output corresponding to the reset condition of the latch. One input of the first AND gate 39 constitues the enable signal appearing on the lead 26 from the display controller 19. The other input of the first AND gate 39 constitutes the reset output of the second latch 45 which appears on lead 47. The output from the first AND gate 39 appears on the lead 40 that is coupled to the register 48. A signal appearing on the lead 40 enables the register 48 to receive the identification code appearing on the leads 16 corresponding to the code word appearing in the display controller 19. The output of the first AND gate 39 is also coupled to the set input of the first latch 42 by way of lead 30. When enabled, the output of the first AND gate 39 functions to set the first latch 42. The reset input to the first latch 42 is the disable signal appearing on the lead 28 from the display controller 19. When present, the disable signal on lead 28 functions to reset the first latch 42. The output from the light pen 37 appearing on the lead 38 is coupled to one input of the second AND gate 43 whereas the second input to the AND gate 43 is the set output from the first latch 42 appearing on lead 44. When the first latch 42 is set the output on the lead 44 is enabled such that the occurrence of an output pulse from the light pen 37 on lead 38 enables the second AND gate 43 to produce an output signal on output lead 35. However, when the first latch 42 is reset, the output lead 44 is disabled and a light pen 37 output signal appearing on the lead 38 will not enable the second AND gate 43. As will now be apparent, the light pen 37 output is enabled whenever the first latch 42 is set and is disabled whenever the first latch 42 is reset. The output of the second AND gate 43 appearing on lead 35 is coupled to the set input of the second latch 45. When enabled, this output functions to place the second latch 45 into its set condition. The reset input of the second latch 45 is coupled to the digital computer 11 by way of lead 12. A signal appearing on the lead 12 from the computer 11 functions to place the second latch 45 into its reset condition. When the second latch 45 is in a set condition a signal appears on lead 46 which is coupled to the general purpose digital computer 11. As discussed above, the second latch 45 is set whenever the second AND gate 43 is enabled due to a light pen 37 output signal. Accordingly, the set condition of the second latch 45 indicates to the computer 11 that the register 48 contains the identification code of an image, or a portion thereof, on the screen 18 that has been identified by the light pen 37. The reset output of the second latch 45 constitutes the other input to the first AND gate 39. When the second latch 45 is reset, the signal on the lead 47 will enable the first AND gate 39 whenever the enable signal appearing on the lead 26 is present. Accordingly, when the second latch 45 is reset it indicates that the system is ready to receive a light pen 37 output signal to identify the location of a selected portion of the display on the screen 18.

Assume that the system illustrated in the single FIGURE has been initialized and that the first latch 42 and the second latch 45 are both reset. With the first latch 42 reset, an output from the light pen 37 is not enabled. With the second latch 45 reset the lead 47 is enabled to enable the first AND gate 39 if an enable signal appears on the lead 26. The display controller 19 can signal the refresh memory 15 by way of the lead 14 that it is in a condition to receive a code word by way of the leads 17 to generate an image or a portion thereof on the screen 18. If the code word received from the memory 15 is an image or a portion thereof that is part of the display that is not meant to be interactive with the light pen 37, no enabling signal appears on the lead 26 and the first AND gate 39 remains disabled. However, a disable signal does appear on the lead 28 to keep the first latch 42 in a reset condition thereby disabling any output that may be generated by the light pen 37. When the display controller 19 receives a code word that identifies an image, or a portion thereof, that is meant to be interactive with the light pen 37 the lead 26 is enabled and no signal appears on the lead 28. Accordingly, since the second latch 45 is reset the first AND gate 39 is enabled to set the first latch 42 which in turn enables one input of the second AND gate 43. Enabling of the first AND gate 39 also enables the register 48 by way of the lead 40 to enable the register 48 to store the identification codes that occur on the leads 16 as code words are successively applied to the display controller 19 by way of the leads 17 to generate the desired images. As long as there is no output from the light pen 37 on the lead 38 the second latch 45 remains reset and the first latch 42 remains set. The register 48 will continue to receive identification codes for the code words that are so identified as they are supplied to the display controller 19 as the images are generated on the screen 18. As discussed hereinabove, at least some segments of a display can have an identification code supplied to the register 18 or, in the alternative, the identification code within the register 48 may identify an entire image, or images. In this case the identification code in the register 48 remains in the register 48 while the various code words which are needed to generate the entire image(s) are successively applied to the display controller 19.

When an operator desires to identify a particular portion of the display, the light pen 37 is moved adjacent to the desired portion of the display and activated in a well known manner thereby providing an output on the lead 38 that enables the second AND gate 43. The resulting output signal on the lead 35 will cause the second latch 45 to be placed into its set condition. This causes a signal on the lead 46 which informs the digital computer 11 that the register 48 now contains the identification code of the operator selected portion of the display. With the second latch 45 set, the lead 47 is no longer enabled and the first AND gate 39 is now disabled. With no output from the first AND gate 39 appearing on the lead 40, the register 48 will no longer receive the identification code of the code words that are supplied to the display controller 19 as the display continues to be generated on the screen 18. The identification code within the register 48 is transferred to the computer 11 by way of the leads 49 whenever the computer 11 provides an enabling signal to the register 48 by way of the lead 41. Once received by the computer 11, the identified portion of the display will be altered in a desired manner such as by erasing that portion of the image, expanding the image, causing the image to flash, or any other desired operation. The operation to be performed on the identified portion of the image is generally controlled by an operator controlled input (not shown) to the computer 11 in accordance with well known techniques. Once the identification code in the register 48 has been removed to the computer 11, the computer 11 can store the identification code therein temporarily in a buffer register (not shown) until the computer 11 has time to perform the desired operation or the desired operation can be performed immediately. Once the identification code is removed from the register 48, however, the computer 11 will not reset the second latch 45 by enabling the lead 12 until the computer 11 is ready to receive a new identification code. When the second latch 45 is reset, the other input to the first AND gate 39 appearing on the lead 47 is enabled. Therefore as long as a portion of the display is being generated that is meant to be interactive with the light pen 37, the enable signal on lead 26 is present thereby enabling the first AND gate 39. When so enabled, the output of the first AND gate 39 again enables the register 48 by way of the lead 40 to load the identification codes on the leads 16 into the register 48. The first AND gate 39 being enabled also sets the first latch 42 which enables the output 44 which in turn will cause the second AND gate 43 to be enabled in the presence of an output from the light pen 37 to again make the system responsive to a selected portion of the display on the screen 18 that is meant to be interactive with the light pen 37.

As will be apparent from the description set forth hereinabove, the system described allows the light pen 37 to be disabled to prevent erroneous inputs into the computer 11 when a portion of the display being generated on the screen 18 is not to be interactive with the light pen 37. Additionally, the system described has the flexibility of allowing an entire image to be identified by a single identification code or having one or more of the segments which make up the displayed image to be identified by unique identification codes.

What is claimed is:

1. A display system comprising:
    a cathode ray tube having an intensity control input for an electron beam therein and having a sweep control input for deflecting said electron beam across a screen of said cathode ray tube to produce at least one luminous trace thereon;
    a light pen positionable adjacent to a trace on said screen for picking up at least one light pulse from a displayed trace and producing an electrical output signal indicative thereof;
    computing means including a memory for storing a plurality of code words that identify the different components of an image to be traced on said screen and for storing an identification code that identifies at least some of said code words;
    display control means coupled between said computing means and said inputs to said cathode ray tube;
    said display control means adapted to sequentially receive said code words from said memory and in response thereto to provide signals to said intensity control input and said sweep control input to cause the image, or portion thereof, identified by said code words to be traced on said screen of said cathode ray tube;
    a register coupled to said memory and adapted to receive a said identification code as a said code word indicative of an image, or portion thereof, to be traced is transferred into said display control means; and
    transfer means coupled to said computing means and responsive to said light pen output signal for enabling a said identifying code in said register to be transferred to said computing means.

2. The display system according to claim 1 further including
    means coupling said display control means to said light pen whereby said light pen is enabled and disabled under the control of said display control means.

3. The display system according to claim 1 further including:
    an AND gate having an output and at least two inputs;
    said light pen output signal coupled to one input of said AND gate;
    said display control means including a light pen enable output signal coupled to the other input of said AND gate;
    said light pen enable signal being active when an image, or a portion thereof, is being traced on said screen in response to a said code word;
    said AND gate output being active in response to a said light pen output signal occurring while said light pen enable signal is active.

4. The display system according to claim 3 wherein
    said transfer means are in response to said AND gate output being active for enabling said identification code in said register to be transferred to said computing means.

5. The display system according to claim 3 further including
    a bistable device having a first output indicative of a first stable state and a second output indicative of a second stable state;
    said bistable device having a first input for setting said bistable device into the first stable state and a second input for setting said bistable device into the second stable state;
    said AND gate output coupled to the first input of said bistable device to set said bistable into the first stable state whenever said AND gate output is active.

6. The display system according to claim 5 wherein
    said transfer means is responsive to the first output of said bistable device for enabling said identifying code in said register to be transferred to said computing means.

7. The display system according to claim 6 wherein
    said computing means is coupled to the second input of said bistable device for setting said bistable device into the second stable state after the identifying code in said register has been transferred to said computing means.

8. The display system according to claim 7 further including
another AND gate for coupling said light pen enabling signal from said display control means to the one input of said AND gate;
said other AND gate having an output and at least two inputs;
said output of said other AND gate coupled to the other input of said AND gate;
said light pen enabling signal coupled to one input of said other AND gate and the second output of said bistable device coupled to the other input of said other AND gate to enable said light pen only when said bistable device is in the second stable state.

9. The display system according to claim 8 further including;
another bistable device coupled between said AND gate and said other AND gate and having a first and second stable state with at least a first output indicative of the first stable state, a first input for setting said other bistable device into the first stable state and a second input for setting said other bistable device into the second stable state;
the first output of said other bistable device coupled to the other input of said AND gate;
the output of said other AND gate coupled to the first input of said other bistable device;
said display control means including a light pen disable output signal coupled to the second input of said other bistable device;
said light pen disable signal being active when an image, or a portion thereof, is being traced on said screen, that is not to be interactive with said light pen;
said light pen disable signal being active causing said other bistable device to be set into its second stable state whereby said light pen is disabled.

10. The display system according to claim 2 wherein
said display control means enables said light pen whenever an image, or portion thereof, is being traced on said screen and disables said light pen whenever another image, or portion thereof, is being traced on said screen.

* * * * *